(12) United States Patent
Prasad et al.

(10) Patent No.: US 11,043,056 B2
(45) Date of Patent: *Jun. 22, 2021

(54) DOOR ACCESS CONTROL VIA A MOBILE DEVICE

(71) Applicant: Honeywell International Inc., Morris Plains, NJ (US)

(72) Inventors: Vinay Prasad, Bangalore (IN); Sanjay Roy, Plymouth, MN (US); Manu Taranath, Bangalore (IN); Mandar Tigga, Bangalore (IN); Haraprasad Senapati, Bangalore (IN); Bryan Jones, Muswellbrook (AU); Murugan Gopalan, Bangalore (IN); Roshan Valder, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/287,759

(22) Filed: Feb. 27, 2019

(65) Prior Publication Data

US 2019/0197801 A1    Jun. 27, 2019

Related U.S. Application Data

(63) Continuation of application No. 15/699,160, filed on Sep. 8, 2017, now Pat. No. 10,255,732.

(Continued)

(51) Int. Cl.
*G07C 9/22* (2020.01)
*G07C 9/00* (2020.01)
(Continued)

(52) U.S. Cl.
CPC .............. *G07C 9/22* (2020.01); *G06F 21/35* (2013.01); *G07C 9/00309* (2013.01);
(Continued)

(58) Field of Classification Search
CPC ............ G07C 9/00111; G07C 9/00309; G07C 2009/00793; G07C 9/00103;
(Continued)

(56) References Cited

U.S. PATENT DOCUMENTS 5,841,361 A    11/1998  Hoffman
9,032,498 B1    5/2015  Ayed
(Continued)

FOREIGN PATENT DOCUMENTS

EP    2816532 A2    12/2014
JP    4578984 B2    11/2010
(Continued)

OTHER PUBLICATIONS

International Search Report and Written Opinion from related PCT Application No. PCT/US2017/050729 dated Dec. 15, 2017 (10 pages).

(Continued)

*Primary Examiner* — Brian Wilson
(74) *Attorney, Agent, or Firm* — Seager, Tufte & Wickhem, LLP

(57) ABSTRACT

Devices, systems, and methods for door access control via a mobile device are described herein. One mobile device for providing door access control, includes a processor and memory, coupled to the processor, wherein the memory includes instructions executable by the processor to provide a specific user identity, assigned to the mobile device, and a digital identifier, that is associated with an application stored in memory on the mobile device, to a door access controller, wherein the application includes a locking mechanism for the application that must be renewed at a first particular time period and wherein the mobile device includes a locking mechanism to lock the device after a second particular time period.

20 Claims, 2 Drawing Sheets

Related U.S. Application Data

(60) Provisional application No. 62/385,020, filed on Sep. 8, 2016.

(51) Int. Cl.
*G06F 21/35* (2013.01)
*H04L 29/06* (2006.01)
*H04W 12/06* (2021.01)
*H04W 12/08* (2021.01)
*H04W 4/33* (2018.01)

(52) U.S. Cl.
CPC ......... *H04L 63/0853* (2013.01); *H04W 12/06* (2013.01); *H04W 12/08* (2013.01); *G07C 9/00571* (2013.01); *G07C 2209/08* (2013.01); *H04W 4/33* (2018.02)

(58) Field of Classification Search
CPC ............ G07C 9/00571; G07C 9/00182; G07C 2009/00634; G07C 2009/00769; G07C 9/22; G07C 2209/08; G06F 21/35; H04L 63/0853; H04W 12/06; H04W 12/08; H04W 4/33
USPC ......................................................... 340/5.7
See application file for complete search history.

(56) References Cited

U.S. PATENT DOCUMENTS

| | | | |
|---|---|---|---|
| 9,241,235 B2* | 1/2016 | Santavicca | G07C 9/00309 |
| 9,336,637 B2 | 5/2016 | Neil et al. | |
| 9,576,412 B2* | 2/2017 | Gudmundsson ... | G07C 9/00142 |
| 9,646,165 B1* | 5/2017 | Saylor | G07C 9/00904 |
| 9,807,568 B1* | 10/2017 | Collar | H04L 41/069 |
| 2013/0214898 A1* | 8/2013 | Pineau | H04L 63/101 |
| | | | 340/5.6 |
| 2014/0019768 A1* | 1/2014 | Pineau | H04W 4/021 |
| | | | 713/186 |
| 2015/0227923 A1* | 8/2015 | Kutsch | G07C 9/257 |
| | | | 705/67 |
| 2016/0133072 A1* | 5/2016 | Santavicca | G07C 9/00309 |
| | | | 340/5.61 |
| 2016/0292709 A1* | 10/2016 | Lindbo | G06Q 30/0234 |
| 2016/0353239 A1* | 12/2016 | Kjellsson | H04W 4/021 |

FOREIGN PATENT DOCUMENTS

| | | |
|---|---|---|
| JP | 2015215663 A | 12/2015 |
| KR | 101296863 B1 | 8/2013 |
| KR | 101570601 B1 | 11/2015 |
| KR | 101595897 B1 | 2/2016 |
| WO | 2014092754 A1 | 6/2014 |

OTHER PUBLICATIONS

India Application No. 201917008159, Examination Report, pp. 5, dated Jul. 27, 2020.

* cited by examiner

DOOR ACCESS CONTROL VIA A MOBILE DEVICE

PRIORITY INFORMATION

This application is a continuation of U.S. application Ser. No. 15/699,160, filed Sep. 8, 2017, entitled, "DOOR ACCESS CONTROL VIA A MOBILE DEVICE, which claims the benefit of U.S. Provisional Application No. 62/385,020, filed Sep. 8, 2016, both of which are incorporated herein by reference.

TECHNICAL FIELD

The present disclosure relates to systems, devices, and methods for door access control via a mobile device with multi-factor authentication.

BACKGROUND

Door access control systems are designed to provide access to areas of a building for individuals who are authorized to access such areas and deny access to those areas of the building to individuals who are not authorized to access such areas. For example, certain individuals may be authorized to access a secure area of a building, whereas other individuals may not be allowed to access the secure area.

Previous approaches to door access control systems may utilize costly hardware devices located at perimeter(s) of secure areas to verify a user's identity. In some examples, personal identification number (PIN) pads, biometric sensors (e.g., fingerprint sensors and/or physical access cards (e.g., badges) may be used.

Carrying a physical access card may be cumbersome and in some systems, the card can continue to be misused (for example, by a thief who has stolen the card) until the incident is reported and the card is blocked. Another issue is that a user may be locked out of an area if the user forgets to carry the physical access card, and an unauthorized user may gain access to a secure area because the door access control system cannot verify the physical identity of the user carrying the physical access card.

In addition, such hardware devices may not only be expensive to install, operate, and/or maintain, but may soon become obsolete. This obsolescence can be caused by the system not being upgradable (e.g., a card reader may not be upgradable to a keypad or biometric reader).

DETAILED DESCRIPTION

Figure 1:
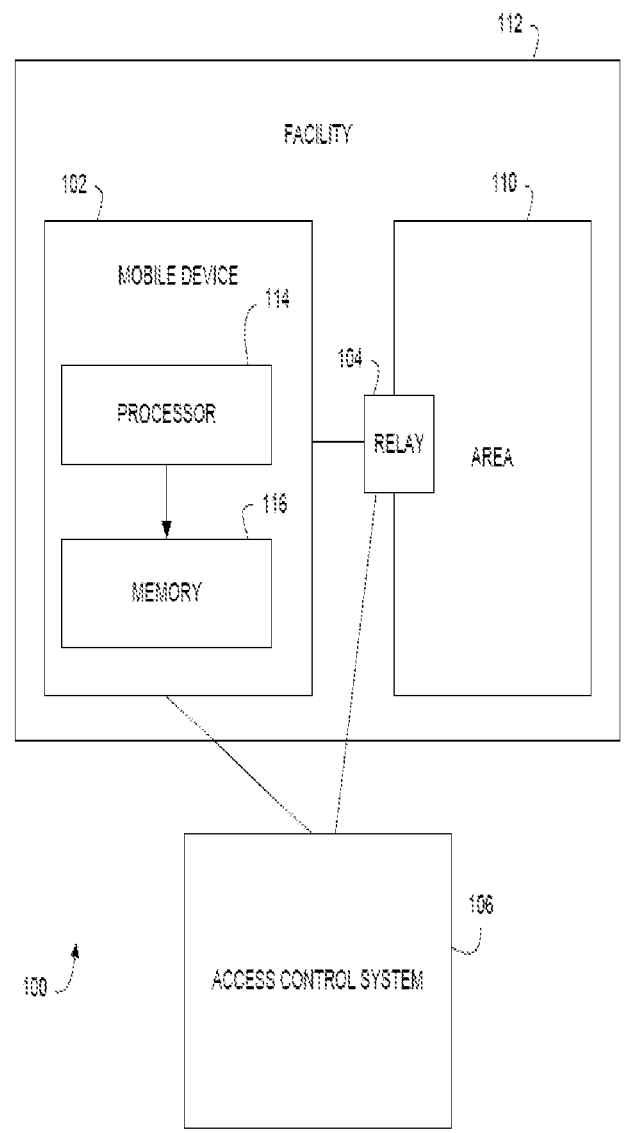
FIG. 1 illustrates a system for access control via a mobile device in accordance with one or more embodiments of the present disclosure.

Devices, systems, and methods for door access control via a mobile device are described herein. One mobile device for providing door access control, includes a processor and memory, coupled to the processor, wherein the memory includes instructions executable by the processor to provide a specific user identity, assigned to the mobile device, and a digital identifier, that is associated with an application stored in memory on the mobile device, to a door access controller, wherein the application includes a locking mechanism for the application that must be renewed at a first particular time period and wherein the mobile device includes a locking mechanism to lock the device after a second particular time period.

Generally speaking, increased security can be provided through capabilities offered by mobile devices. In some embodiments, biometric validation (e.g., fingerprint scanning) can be carried out via the mobile device. In some embodiments, users (i.e., the user's mobile device) can be assigned a digital identifier (discussed further below). The digital identifier can allow the mobile device, instead of a physical hardware access controller, to control access, for instance.

User interaction with the door access control system can be streamlined via capabilities offered by mobile devices. For example, in some embodiments, global positioning system (GPS), WiFi, and/or other location functionalities provided by the mobile device may allow the automatic determination of user location (e.g., without user input). Thus, rather than physically presenting a card (or other device) for access to an area, the user can simply move within a particular distance of the area.

That is, whereas previous approaches may utilize "card readers," which typically call for a user to present a card (e.g., badge and/or other token), read the card, then transmit a signal physically to an access controller to make an access determination (e.g., whether the user is allowed access), embodiments of the present disclosure can allow the mobile device itself to effectively become the card and have multiple layers of authentication to minimize the ability of a non-authorized party of misusing the device. Then, the "card" can be presented to a "reader" by virtue of the mobile device being in a particular physical location (or within a particular distance of a particular physical location) and meeting other layers of security as discussed herein.

Embodiments of the present disclosure can reduce the potential manners in which a non-authorized party may attempt to gain access to unauthorized areas. For example, generally, by adding multiple layers of authentication, a non-authorized party will need to be more sophisticated to gain access to an unauthorized space. Further, when physical devices and/or tokens are needed to gain access, then the task for a non-authorized party becomes much more difficult.

Through use of the devices, systems, and methods discussed herein a number of multiple layer authentication mechanisms are employed. For instance, in some embodiments, the user wanting access to an area of a facility in which they need authorization needs to have a specific user identity, assigned to the mobile device.

This can, for example, be the specific serial number provided to the device by the manufacturer, another specific identifier associated with the device, or an identifier assigned by the entity controlling access to the area of the facility, among other suitable identifiers. The user also may be required to provide a digital identifier, that is associated with an application stored in memory on the mobile device.

Such multiple layers of security can also include the application having a locking mechanism for the application that must be renewed at a first particular time period. This renewal can be done by the user or, in some embodiments, by the entity controlling access to the area of the facility. In this manner, if a user's employment is terminated, the entity can elect to not renew the locking mechanism and therefore the user can no longer access the application and can also no longer access the area needing authorization.

Further, in some embodiments, the mobile device also includes a locking mechanism to lock the device after a second particular time period. This security layer requires the user to be present with the device to unlock it and therefore a non-authorized party will either need the user to unlock the device for them or access the door within the time period when the device has been unlocked by the user. Depending on the time period that is set for this function, it may be extremely difficult for a non-authorized party to access the door within the time period.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. As used herein, "a" or "a number of" something can refer to one or more such things. For example, "a number of areas" can refer to one or more areas.

FIG. 1 illustrates a system 100 for access control via a mobile device in accordance with one or more embodiments of the present disclosure. As shown in FIG. 1, system 100 includes a mobile device 102, a relay 104, and a door access control system (ACS) 106.

One or more portions of the system 100 can be implemented in a facility 112, for instance. A facility, as used herein, can refer to one or more buildings, businesses, homes, plants, hospitals, refineries, etc. Facilities can include indoor and/or outdoor areas.

Though in the example illustrated in FIG. 1 the ACS 106 is shown external to the facility 112 (e.g., remote with respect to the facility 112), embodiments of the present disclosure are not so limited. In some embodiments, the ACS 106 is internal to the facility 112 (e.g., local with respect to the facility 112).

The mobile device 102 can be a client device carried or worn by a user. For example, the mobile device 102 can be a phone (e.g., smartphone), personal digital assistant (PDA), tablet, and/or wearable device (e.g., wristband, watch, necklace, etc.).

The mobile device 102 can include one or more software applications (e.g., apps) which can define and/or control communications between the mobile device 102, the ACS 106, and/or other devices. Apps may be received by the mobile device 102 from the ACS 106, for instance.

Apps may be launched by a user and/or responsive to some other condition (e.g., the interaction between the mobile device 102 and a device within the door access system, such as a controller or relay). In some embodiments, apps can be executing as background apps. As used herein, apps include a digital identifier, discussed further below.

The relay 104 can be a device allowing remote control that can be actuated by variation in conditions of one or more electric circuits. In some examples, the relay 104 can be a locking device (e.g., for a door). In some examples, the relay 104 can include one or more actuating mechanisms. The relay 104 can be associated with one or more controlled functionalities. As used herein "controlled functionality" refers to a functionality under the control of the ACS 106. For instance, an electronic door lock may be controlled by the ACS 106.

In some embodiments, the control may be provided from the mobile device 102 as long as the requirements of each of the security layers have been met, as described in the embodiments herein. In some embodiments, the control may be provided directly (from the ACS 106 to the relay 104) or via one or more intermediary devices (e.g., a controller) in communication with the relay 104.

Because, as described above, the "card" can be presented to a "reader" by virtue of the mobile device 102 being in a particular physical location (or within a particular distance of a particular physical location) and meeting the multiple layers of authentication discussed herein, embodiments of the present disclosure can implement the relay 104 in the absence of a controller (e.g., a local controller). That is, in some embodiments, the relay 104 does not include a controller. Various examples herein may refer to the relay 104 being a locking device for a door, but it is to be understood that such examples are not to be taken in a limiting sense; embodiments of the present disclosure do not limit relay 104 to a particular device.

The relay 104 can be associated with an area 110 of the facility 112. As referred to herein, an area can be a portion of a facility. In some embodiments, the area 110 can be a room, a plurality of rooms, a wing, a building, a plurality of buildings, an installation, etc. In some embodiments, the area 110 can be defined by physical boundaries (e.g., walls, doors, etc.). In some embodiments, the area 110 can be defined by logical and/or geographic boundaries. The area 110 can be defined by a user, by a Building Information Model (BIM) associated with the facility 112, and/or by the ACS 106.

The ACS 106 can control (e.g., manage) access to a number of areas (e.g., the area 110) of the facility 112. As previously discussed, the ACS 106 can be remote with respect to the facility 112 and/or local with respect to the facility 112. In some embodiments, the ACS 106 can be cloud-based. In some embodiments, the ACS 106 can manage access to one or more areas across a plurality of facilities.

The mobile device 102 can communicate with (e.g., exchange data with) the ACS 106 via a wired and/or wireless connection, for instance. In some embodiments, the mobile device 102 can communicate using one or more communication modules (e.g., cellular, WiFi, etc.). The ACS 106 can communicate with the relay 104 via a wired and/or wireless connection, for instance.

Communication between various devices herein can be carried out over a wireless network. A wireless network, as used herein, can include WiFi, Bluetooth, or any other suitable means to wirelessly transmit and/or receive information.

As discussed above, mobile device 102 can include a memory 116 and a processor 114 configured to execute executable instructions stored in the memory 116 to perform various examples of the present disclosure, for example. For instance, a mobile device for providing door access control can include a processor and memory that is coupled to the processor.

The memory includes instructions executable by the processor to provide a variety of functions and data also stored in the memory to be used in executing the instructions. For example, in some embodiments, the memory includes instructions executable by the processor to provide data in the form of a specific user identity, assigned to the mobile device to the door access controller.

The memory can also include data in the form of a digital identifier, that is associated with an application that is also stored in memory on the mobile device. The memory can also include instructions executable by the processor to provide this information to a door access controller when the application is unlocked (i.e., the user has met certain conditions that enable the user to request that the digital identifier be sent to the door access controller. In some embodiments, the meeting of the conditions will initiate the sending of the identifier automatically.

In implementing a multiple layer authentication system using this information, the system can first verify that the device belongs to a user that is authorized to access the area that is to be accessed based on the user identity of the device being associated with the user. This association can, for example, be stored in memory of the ACS or at another location. When the identity is sent from the mobile device, the association with the user attempting to access the area can be verified and the user's authorization to access the area can also be verified.

In addition to this layer of security, the user also needs to provide the digital identifier associated with an application on the mobile device. This digital identifier can be any suitable identification data that can be stored in memory and used to identify a particular user's mobile device.

For example, the entity determining the access into the area can assign an identifier to a particular person through the application. In order to accomplish such functionality, the instructions on the mobile device can be executed by the processor to determine whether a user of the mobile device is allowed access to the area can include instructions to determine whether the mobile device has been provided with a digital identifier and then provide that identifier to the user and/or the ACS.

Further, the application can also include a locking mechanism for the application that must be renewed at a first particular time period. For example, the renewal of the application could be the reinstallation of the application on the mobile device, the resetting of a timer, the changing of an expiration date, or other suitable mechanism that will act to lock the user out of the application after a certain predetermined time period passes.

In such embodiments, if the renewal is not made, the user will not be able to access the application and, as such, will not be able to access the digital identifier. To accomplish such functionality, the executable instructions can include instructions that will not provide the digital identifier to the user and/or to the ACS unless the associated application is unlocked.

As an added layer of security, the mobile device can also include a locking mechanism to lock the device after a second particular time period. This second time period can be different than the first time period discussed above with respect to the locking of the application.

For example, the locking of the application may be set to lock the application if not renewed within a three month period, but the locking mechanism for the device may be set to lock the user from accessing applications and other information on the device after a few minutes or hours of non-use by the user. In this manner, the user must unlock the device to access the application and unlock the application in order to access the digital identifier.

Such functionality can be accomplished, for example, by having executable instructions stored in memory on the mobile device that require a submission by the user of a valid unlocking criterion before the mobile device will be unlocked. The unlocking criterion can be any suitable item, such as one or more of a name, password, passcode, one time password, signature, pattern, fingerprint, face recognition, voice information, iris information, and/or knock recognition.

As discussed herein, the embodiments of the present disclosure can be particularly difficult to overcome by non-authorized party as the executable instructions will not provide the digital identifier unless the associated application and the mobile device are unlocked which both require different actions by the user.

Provided below is an example of a system embodiment of the present disclosure. In this embodiment, the system for providing door access control via a mobile device includes a mobile device and a door access control system.

The mobile device is configured to provide a specific user identity assigned to the mobile device and a digital identifier that is associated with an application on the mobile device to a device of the door access control system (e.g., a controller, relay, etc.). As discussed above, the application includes a locking mechanism for the application that must be renewed at a first particular time period. The mobile device also includes a locking mechanism to lock the device after a second particular time period.

In addition to the other mechanisms discussed herein, the locking mechanisms for the application and/or the mobile device can, for example, be unlocked based on a meeting of a criterion. For example, one or more suitable criteria can include: name, password, passcode, one time password, signature, pattern, fingerprint, face recognition, voice information, iris information, and/or knock recognition.

The door access control system includes executable instructions to determine an area of a facility to which a user is authorized access. This can, for example, be accomplished by checking data stored in the memory of the ACS or elsewhere, such as on a device connected to the ACS via a network.

The ACS can also be configured to receive and confirm that the user identity and digital identifier are valid. This can also be accomplished by checking data stored in the memory of the ACS or elsewhere, for example.

In addition to the items above, the ACS can also be configured to receive confirmation that the application and the mobile device are unlocked. Such confirmation can be sent by execution of instructions on the mobile device to effectuate the sending of one or more confirmation messages or data that could be interpreted by the ACS as a confirmation that one or both of the application and mobile device are unlocked.

Once the ACS receives and confirms that all criteria for accessing the area have been met (e.g., if the user identity and identifier are valid, and confirmations that the application and mobile device are unlocked), the ACS can authorize access to the authorized area by the user.

In such systems, it can be possible to set the first particular period of time differently for different classes of users based on their employment type. For example, someone who works in the area that is to be accessed may have a much longer period of time in which they will be authorized to access the area without renewal of their access to the application as compared to a private contractor who may be accessing the area for only a few hours on a particular day. The contractor may have to renew their access to the application in a day or a few hours where the person working in the area may need to renew ever month or a few months. In some embodiments, all workers of a certain class may have the same time periods, but in other embodiments, each individual may be assigned a time period based on their particular access needs to the area to be accessed.

The memory 116 can be any type of non-transitory storage medium that can be accessed by the processor 114 to perform various examples of the present disclosure. For example, the memory 116 can be a non-transitory computer readable medium having computer readable instructions (e.g., computer program instructions) stored thereon that are executable by the processor 114.

The memory 116 can be volatile or nonvolatile memory. The memory 116 can also be removable (e.g., portable) memory, or non-removable (e.g., internal) memory. For example, the memory 116 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 116 is illustrated as being located within the mobile device 102, embodiments of the present disclosure are not so limited. For example, memory 116 can also be located internal to another computing resource (e.g., enabling computer readable instructions to be downloaded over the Internet or another wired or wireless connection). In some embodiments, the memory 116 and/or the processor 114 can be located in the ACS 106.

In addition to, or in place of, the execution of executable instructions, various examples of the present disclosure can be performed via one or more devices (e.g., one or more controllers) having logic.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

As discussed herein, the determination of whether the user of the mobile device is allowed access to the area can be made by the mobile device. Accordingly, access control (i.e., the determination of whether to grant access) can be moved from a controller (or other hardware device(s) seen in previous approaches) to the mobile device itself. Accordingly, where access control is implemented on a mobile device in accordance with embodiments of the present disclosure, facilities need not employ complex physical access controllers capable of managing access only to a limited number of access points (e.g., doors) as in previous approaches. Instead, a remote and/or virtual (e.g., cloud-based) controller can be implemented, for instance, in conjunction with one or more relays (such as those previously discussed).

As discussed above, determining whether the user is allowed access to the area can include determining whether the user (via the mobile device) has been provided with (or otherwise received) a digital identifier. A digital identifier can correspond to the physical identity of the user. The digital identifier can be unique to the mobile device of the user (e.g., one digital identifier per mobile device of the user). The digital identifier can be (or be a portion of) an app, for instance (e.g., executable instructions stored on a computer-readable medium).

In some embodiments, the digital identifier can be a permanent digital identifier. A permanent digital identifier can be a digital identifier that does not expire. For example, a permanent digital identifier can be sent to the mobile device of a user who is an employee that works in the facility. The employee can utilize the permanent digital identifier until the employee is no longer employed at the facility. In such embodiments, the access to the application can be renewed rather than the digital identifier in order to update that layer of security.

In some embodiments, the digital identifier can be a temporary digital identifier. A temporary digital identifier can be a digital identifier that expires after a set period of time. This can be yet another layer of security that may be employed in the embodiments of the present disclosure.

For example, a temporary digital identifier can be sent to the mobile device of a user who is a visitor or guest at the facility. After the set period of time, the visitor/guest's temporary digital identifier can expire, and the visitor/guest can lose access to the building (or to particular areas of the building). In some embodiments, the digital identifier can be shared with a building management system. The building management system can allow management (e.g., monitoring and/or control) of the facility.

Thus, determining whether the user of the mobile device is allowed access to the area can include determining whether the user is allowed access at the particular time. The time can refer to the time of a day and/or the day of a week, for instance, though embodiments of the present disclosure are not so limited.

A digital identifier can be associated with (e.g., assigned) access rights. Access rights assigned to a digital identifier can vary from one user to another. Access rights, as used herein, can include information describing a user's ability to access different areas of a facility. For example, a supervisory employee may be able to access more areas of a facility than a lower level employee.

As discussed above, in some embodiments, the access rights can be preconfigured access rights. For example, certain groups of employees, such as lower level employees can be given an access level that grants an employee access to lower security areas of a facility, whereas higher level employees can be given an access level that allows those higher level employees access to areas with higher security restrictions. As an additional example, access levels can be preconfigured based on the position the employee holds (e.g., a secretary can receive a different access level than a building technician).

In some embodiments, the access rights can be customized access rights. Customized access rights can include access rights that are customized for an individual user. For example, a user can receive access to areas A, B, C, and E, but not area D. As another example, a user can receive access to a number of areas of a building that do not fall within a preconfigured access level.

In some embodiments, a digital identifier may expire after a particular period of time (e.g., one day). In some embodiments, a digital identifier may expire based on a location of the mobile device. For example, a digital identifier may expire when a user visiting the facility exits the facility. As the digital identifier expires, so too can the access rights associated with it.

Figure 2:
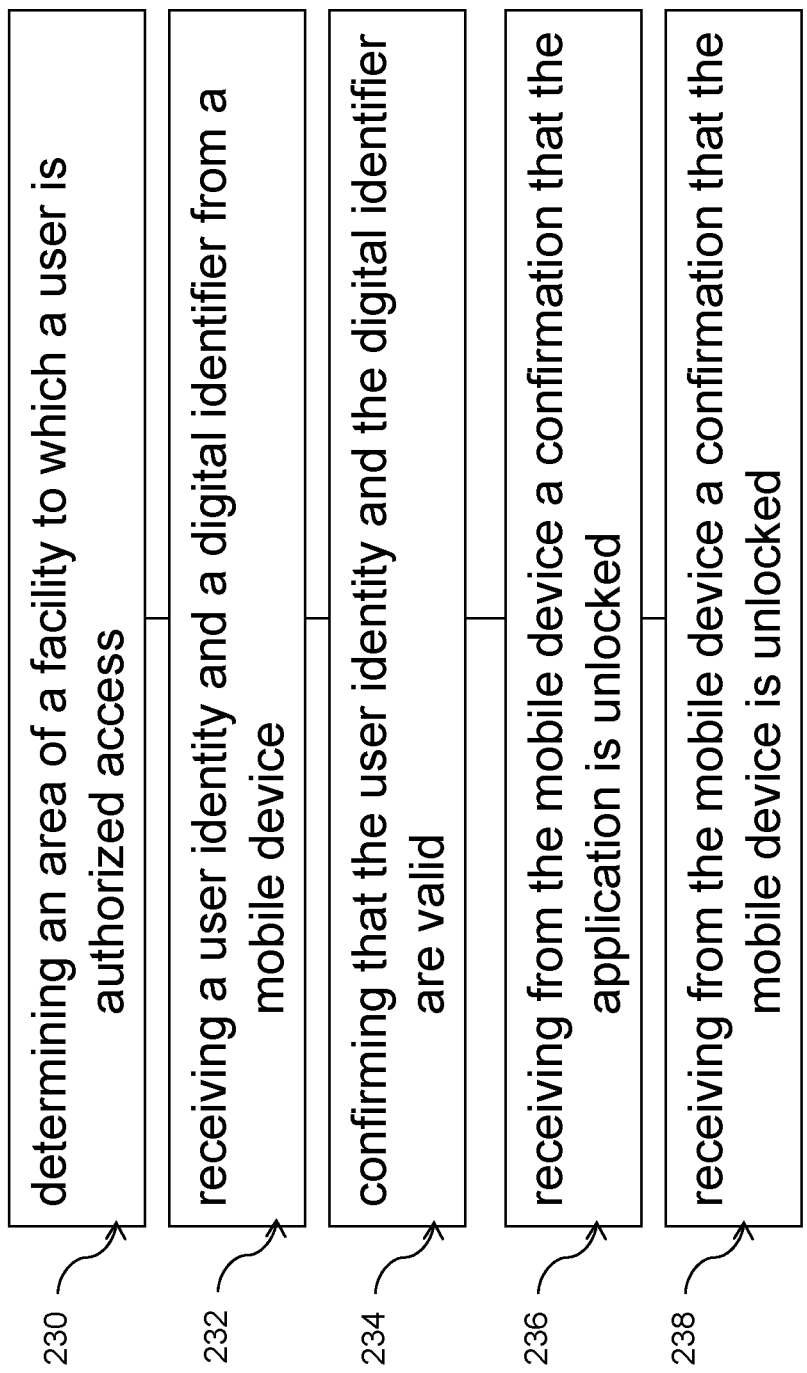
FIG. 2 illustrates a method for access control via a mobile device in accordance with one or more embodiments of the present disclosure.

FIG. 2 illustrates a method for access control via a mobile device in accordance with one or more embodiments of the present disclosure. In some embodiments, method of FIG. 2 can be performed by the mobile device 102 (previously discussed in connection with FIG. 1). In some embodiments, the method of FIG. 2 can be performed by ACS 106 (previously discussed in connection with FIG. 1), though embodiments of the present disclosure are not so limited.

At block 230, the method includes determining an area of a facility to which a user is authorized access. As discussed herein, this can be a portion of a facility.

At block 232, the method includes receiving a user identity and a digital identifier from a mobile device. At block 234, the method includes confirming that the user identity and the digital identifier are valid. These method elements are discussed in more detail above.

At block 236, the method includes receiving from the mobile device a confirmation that the application is unlocked. In some embodiments, the determination of whether the user of the mobile device is allowed access to the area can be made by the mobile device. In some embodiments, the determination of whether the user is allowed access to the area can be made by a (local and/or remote) door access control system.

At block 238, the method includes receiving from the mobile device a confirmation that the mobile device is unlocked. In some embodiments, method embodiments can further include authorizing access to the authorized area by the user if the user identity and identifier are valid, and confirmations that the application and mobile device are unlocked are received from the mobile device.

In accordance with one or more embodiments of the present disclosure, mobile devices can receive an input (or a plurality of inputs) from a user requesting access. In some embodiments, access or access denial may depend on the performance of one or more particular inputs. The performance of such inputs may take place at a particular time and/or at a particular location.

As such, in some embodiments, methods can further include confirming that the user has completed a required gesture with the mobile device. For example, in some such embodiments, confirming that the user has completed a required gesture includes confirming that the mobile device was moved within a predetermined distance to an object associated with the area. Methods can, for instance include confirming that the user has completed a required gesture such as confirming that the mobile device was manipulated in particular manner.

A gesture, as referred to herein, includes a particular movement, positioning, orientation, and/or manipulation of the mobile device. For example, in some embodiments, the gesture can include a knock by the user on the mobile device. In some embodiments, the gesture can include a plurality of knocks by the user on the mobile device. A "knock" can refer to a striking, by an object, of the mobile device. A knock on the mobile device can resemble a knock on a door, for instance.

In some embodiments, the gesture can include a manipulation of an orientation of the mobile device. For example, the mobile device can be shaken, rotated, and/or twisted, among other manipulations. In some embodiments, the gesture can include a presentation of the mobile device to an object associated with the area. That is, the mobile device can be presented (e.g., drawn near) a door, door reader, turnstile, door frame, etc. The mobile device can be knocked against a card reader, for instance.

In some embodiments, the gesture can include a particular manipulation of the mobile device, wherein the particular manipulation does not include the mobile device impacting an object. For example, the mobile device can be used to "knock" without making contact with another object (other than the user).

In some embodiments, the mobile device can be configured to prompt the user to make the gesture. For example, upon determining that the mobile device is within the particular distance of the area of the facility, embodiments of the present disclosure can prompt the user to make the gesture. The prompt can be a particular sound played by the mobile device and/or a particular vibration, among other prompts. In some embodiments, performance of the gesture before the prompt to make the gesture may be ineffective at obtaining access.

If the user is determined to be allowed access to the area, and if a proper input was made by the user into the mobile device (e.g., an acceptable gesture was made), the mobile device and/or the door access control system can transmit a signal (e.g., a control signal) to a relay associated with the area to allow access. In an example, the relay can be responsible for physically locking a door to the area and the signal causes the relay to change from a locked mode to an unlocked mode. Thus, the relay can grant the user access to the area of the facility responsive to a determination by the mobile device and/or the door access control system that the user is allowed access.

Although not illustrated in FIG. 2, method can include providing a number of notifications via the mobile device. A notification can be provided, for instance, responsive to access being granted to the user. In some embodiments, the mobile device can emit a particular audio notification (e.g., a beep) when access is granted. In some embodiments, the mobile device can vibrate when access is granted.

A notification can be provided, for instance, responsive to access being denied to the user. In some embodiments, the mobile device can emit a particular audio notification (e.g., a buzzer) when access is denied. In some embodiments, the mobile device can vibrate when access is denied. In some embodiments, the notification can include an audio and/or textual message including an explanation and/or reason for the denial of access.

The notification of the denial can include an option to contact a security operator (e.g., guard) and/or maintenance personnel. Thus, if equipment failure is responsible for the denial it can be addressed in a timely manner. In some embodiments, a notification can be sent to a security operator responsive to a repeated denial and/or a denial to a particular (e.g., highly-secure) area without the user's knowledge.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for providing access to an authorized area via a mobile device, comprising:
   receiving a user identity associated with the mobile device and a digital identifier associated with an application running on the mobile device, the application having an expiration time after which the digital identifier associated with the application becomes invalid;
   confirming that the user identity and the digital identifier are valid;
   confirming that the mobile device and the application are in an unlocked state; and
   authorizing access to the authorized area after both the user identity and digital identifier are confirmed to be valid and both of the mobile device and the application are confirmed to be in the unlocked state.

2. The method of claim 1, wherein the method further includes receiving from a user of the mobile device a gesture recognized by the mobile device;
   confirming that the received gesture is valid; and
   authorizing access to the authorized area after the user identity, the digital identifier and the received gesture are all confirmed to be valid, and both of the mobile device and the application are confirmed to be in the unlocked state.

3. The method of claim 2, wherein the gesture includes moving the mobile device within a predetermined distance of an object associated with the authorized area.

4. The method of claim 2, wherein the gesture includes manipulating the mobile device in particular manner.

5. The method of claim 1, further comprising:
   receiving a user input at the mobile device, wherein the user input includes one or more of a name, a password, a passcode, a signature, a pattern, a gesture, a fingerprint scan, a face image for face recognition, a voice sample for voice recognition, an iris image for iris recognition, and a knock sequence for knock recognition;
   confirming that the user input is valid; and
   unlocking one or both of the mobile device and the application when the user input is confirmed to be valid.

6. The method of claim 5, wherein the user input comprises the fingerprint scan.

7. The method of claim 5, wherein the user input comprises the face image.

8. The method of claim 5, wherein the user input comprises the passcode.

9. A method for providing access to a secure area using a mobile device that has an application program that is used to access the secure area, the method comprising:
   verifying that the mobile device itself is a currently authorized mobile device;
   verifying that the application program running on the mobile device is a currently authorized application program, wherein the currently authorized application program has an expiration date after which the currently authorized application program becomes unauthorized;
   verifying that the user of the mobile device is a currently authorized user of the mobile device;
   authorizing access to the secure area only when the mobile device is verified to be a currently authorized mobile device, the application program running on the mobile device is verified to be a currently authorized application program, and the user of the mobile device is verified to be a currently authorized user of the mobile device.

10. The method of claim 9, wherein the mobile device stores an identifier assigned to the mobile device, wherein verifying that the mobile device itself is a currently authorized mobile device comprises verifying that the identifier assigned to the mobile device is an authorized identifier.

11. The method of claim 9, wherein verifying that the user of the mobile device is a currently authorized user of the mobile device comprises receiving a user input via a user interface of the mobile device, and verifying that the received user input matches an authorized user input.

12. The method of claim 11, wherein the received user input comprises a passcode.

13. The method of claim 11, wherein the received user input comprises biometric information.

14. The method of claim 13, wherein the biometric information comprises one or more of a fingerprint scan, a face image, a voice sample and an iris image.

15. The method of claim 9, wherein the application program stores a digital identifier, and wherein verifying that the application program running on the mobile device is a currently authorized application program comprises verifying that the digital identifier is an authorized digital identifier.

16. The method of claim 9, wherein the application program must be renewed after a period of time to remain a currently authorized application program.

17. A non-transitory computer readable medium storing instructions that when executed by a server, causes the server to:
   receive a user identity associated with a mobile device;
   receive a digital identifier associated with an application running on the mobile device, the application having an expiration time after which the digital identifier associated with the application is not received and/or becomes invalid;
   receive a user input received at the mobile device;
   confirm the user identity and the digital identifier are valid;
   send an authorizing signal authorizing access to an authorized area after the user identity and the digital identifier are confirmed to be valid; and
   not send the authorizing signal authorizing access to the authorized area when any of the user identity and the digital identifier are not confirmed to be valid or are not received.

18. The non-transitory computer readable medium of claim 17, wherein the digital identifier is confirmed to be valid only during one or more predetermined times of a day.

19. The non-transitory computer readable medium of claim 17, wherein the digital identifier is confirmed to be valid only during one or more predetermined days.

20. The non-transitory computer readable medium of claim 17, wherein the user input includes biometric information.

* * * * *